United States Patent [19]

Khare

[11] Patent Number: 5,281,445

[45] Date of Patent: Jan. 25, 1994

[54] COATING OF COMPONENTS OF SULFUR ABSORBANTS

[75] Inventor: Gyanesh P. Khare, Bartlesville, Okla.

[73] Assignee: Phillips Petroleum Company, Bartlesville, Okla.

[21] Appl. No.: 559,923

[22] Filed: Jul. 30, 1990

[51] Int. Cl.$^5$ .............................................. C23C 26/00
[52] U.S. Cl. .................................. 427/445; 427/204; 427/219
[58] Field of Search .................... 427/445, 219, 204

[56] References Cited

U.S. PATENT DOCUMENTS

| | | | |
|---|---|---|---|
| 3,518,206 | 6/1970 | Sowards | 502/64 |
| 3,844,810 | 10/1974 | Pollard | 106/452 |
| 3,939,104 | 2/1976 | Campbell | 502/250 |
| 3,953,218 | 4/1976 | Pollard | 106/31 |
| 4,309,374 | 1/1982 | Pollard | 264/328.1 |
| 4,416,932 | 11/1983 | Nair | 428/209 |
| 4,637,995 | 1/1987 | De Angelis | 502/439 |
| 4,657,592 | 4/1987 | Takubo | 106/272 |
| 4,740,251 | 4/1988 | Howe | 148/113 |
| 4,764,498 | 8/1988 | Wissner | 502/439 |
| 4,776,998 | 10/1988 | Davidson | 264/504 |
| 4,899,012 | 2/1990 | Sachtler | 585/481 |
| 4,939,110 | 7/1990 | Sachtler | 502/66 |

Primary Examiner—Shrive Beck
Assistant Examiner—Vi Duong Dang
Attorney, Agent, or Firm—Charles W. Stewart

[57] ABSTRACT

Provided is an improved process for removing hydrogen sulfide from fluid streams by contacting hydrogen sulfide contaminated fluid streams with a novel composition comprising zinc oxide and a diatomite material coated with a colloidal oxide. Additionally, a novel method for producing a composition comprising the steps of coating a diatomite material with a colloidal oxide solution followed by mixing the thus coated diatomite material with zinc oxide to form a paste is further provided.

4 Claims, No Drawings

COATING OF COMPONENTS OF SULFUR ABSORBANTS

This invention relates to an improved process for removing hydrogen sulfide from fluid streams. In another aspect, this invention relates to a composition suitable for use in such process. A further aspect of this invention relates to an improved method for the manufacture of a sulfur absorption composition suitable for use in the removal of hydrogen sulfide from fluid streams.

The removal of sulfur from fluid streams can be desirable or necessary for a variety of reasons. If the fluid stream is to be released as a waste stream, removal of sulfur from the fluid stream can be necessary to meet the sulfur emission requirements set by various air pollution control authorities. Such requirements are generally in the range of about 10 ppm to 500 ppm of sulfur in the fluid stream. If the fluid stream is to be burned as a fuel, removal of sulfur from the fluid stream can be necessary to prevent environmental pollution. If the fluid stream is to be processed, removal of the sulfur is often necessary to prevent the poisoning of sulfur sensitive catalysts or to satisfy other process requirements.

Various absorption compositions have been used to remove sulfur from fluid streams when the sulfur is present as hydrogen sulfide. These absorption compositions can be manufactured by a variety of methods which include extrusion production techniques. A problem that is often encountered in the production of these absorption compositions is equipment wear caused by the abrasive nature of the absorption materials being manufacture. In certain attempts to produce commercial quantities of absorbent compositions, excessive equipment wear and downtime caused by the abrasive characteristics of the absorption material components have, in effect, rendered the production commercially unviable.

It is thus an object of the present invention to improve the efficiency of the production of absorption compositions.

It is a further object of this invention to reduce the cost of removing certain sulfur compounds from fluid streams.

A still further object of this invention is to improve the efficiency of removal of sulfur from fluid streams.

In accordance with one aspect of the present invention there is provided a composition comprising zinc oxide and a diatomite material coated with a colloidal oxide. In accordance with another aspect of the present invention there is provided a method for producing such a composition comprising coating a diatomite material with a colloidal oxide solution to produce a coated diatomite material followed by mixing the thus coated diatomide material with zinc oxide to form an extrudable paste. Another aspect of the present invention relates to a novel absorption process comprising contacting a fluid stream containing hydrogen sulfide under absorption conditions with a composition comprising zinc oxide and a diatomite material coated with a colloidal oxide.

It has been found that in the production of absorbent compositions having certain quantities of diatomite material equipment wear can be dramatically reduced by coating the diatomite material with a colloidal oxide solution prior to the extrusion of the absorbent composition. Furthermore, the inventive absorption composition comprising a diatomite material coated with a colloidal oxide solution and zinc oxide has been found to be an effective composition for absorbing sulfur from fluid streams. The inventive absorption process of this invention includes the contacting of a sulfur-containing stream under absorption conditions with the inventive absorption composition.

Thus, in accordance with the present invention, an absorbing composition comprising zinc oxide and a diatomite material, coated with a colloidal oxide, is utilized to remove hydrogen sulfide from a fluid stream containing hydrogen sulfide. Additionally, the absorbing composition can contain one or more promoters, such as nickel oxide. Once the absorbing composition of the present invention has been prepared, fluid streams containing hydrogen sulfide are contacted with the absorbing composition under suitable absorbing conditions to substantially reduce the concentration of hydrogen sulfide in the fluid stream without significantly increasing the concentration of sulfur dioxide therein.

It is believed that the hydrogen sulfide is being absorbed by the absorbing composition and thus the terms "absorption process" and "absorbing composition" are utilized for the sake of convenience. However, the exact chemical phenomenon occurring is not the inventive feature of the process of the present invention and the use of the term "absorb" in any form is not intended to limit the present invention.

The absorption process is preferably carried out in cycles comprising an absorption period and a period for the regeneration of the sulfided absorbing composition. The absorption period comprises contacting a gaseous stream which contains hydrogen sulfide with the absorbing composition to thereby remove hydrogen sulfide from the gaseous stream. The absorbing composition becomes sulfided during the absorption period. When the absorbing composition becomes sulfided to the point that regeneration is desirable, preferably when it is nearly completely sulfided, an oxygen-containing gas is passed in contact with the absorbing composition to regenerate the absorbing composition and to convert the absorbed sulfur to a sulfur oxide.

The chemical changes that are believed to occur in the absorbing composition during this cyclic process are summarized in the following equations:

$$ZnO + H_2S \rightarrow ZnS + H_2O \quad \text{(I)}$$

$$ZnS + \text{Oxygen} \rightarrow ZnO + SO_x \quad \text{(II)}$$

Other objects and advantages of the invention will be apparent from the foregoing description of the invention and the appended claims as well as from the detailed description of the invention which follows.

The absorbing composition of the present invention can be utilized to remove hydrogen sulfide from any suitable fluid stream. The hydrogen sulfide can be produced by the hydrodesulfurization of organic sulfur compounds or can be originally present in the gaseous stream as hydrogen sulfide. Examples of such suitable fluid streams include light hydrocarbons such as methane, ethane and natural gas; gases derived from petroleum products and products from extraction and/or liquefaction of coal and lignite; gases derived from tar sands and shale oil; coal-derived synthesis gas; gases such as hydrogen and nitrogen; gaseous oxides of carbon; steam and the inert gases such as helium and argon. Gases that adversely affect the removal of hydrogen sulfide and which should be absent from the gaseous streams being processed are oxidizing agents, examples of which include air, molecular oxygen, the halogens, and the oxides of nitrogen.

The absorbing composition of the present invention can be utilized to remove hydrogen sulfide from olefins such as ethylene. This process, however, should be carried out in the absence of free hydrogen to avoid hydrogenation.

In an embodiment of the present invention, the absorbing composition comprises zinc oxide and a diatomite material, coated with a colloidal oxide. In another embodiment, the absorbing composition can further include metal promoters selected from the group consisting of manganese, rhenium, copper, tungsten, molybdenum, Group VIII metals and mixtures of any two or more thereof. As used herein, the term Group VIII metals, or similar terminology, specifically includes iron, cobalt, nickel, ruthenium, rhodium, palladium, osmium, iridium, and platinum. A presently preferred promoter metal is nickel.

The novel absorption composition, which is also employed in the process of the present invention, is generally prepared by impregnating a dry diatomite material with a colloidal oxide solution in an amount sufficient to give a certain predetermined fraction of the given oxide compound in the final absorption composition. Once the diatomite material is impregnated with the colloidal oxide solution, a calculated amount of dry zinc oxide (ZnO) powder is added and intimately mixed with the impregnated diatomite material in order to form an extrudable paste. The extrudable paste is then extruded through any suitable type of extrusion device for the production of an extrudate.

The extrudate can further be processed by drying the wet extrudate followed by a calcination step. After the calcination of the extrudate, a metal promoter can be added by any suitable means to give the desirable concentration of metal promoter followed by another drying step and another calcination step. The final absorption product can then be used in the appropriate absorption process for removing sulfur contaminants from a fluid stream under the appropriate absorption conditions.

The diatomite material used in the absorption composition can be any suitable form of silica including, but not limited to, naturally occurring silica such as diatomaceous earth, which is also called kieselguhr or diatomite or celite, and synthetic silicas such as zeolites, high silica zeolites, precipitated or spray dried silicas or clay, and plasma-treated silica or clay. As referred to herein, the term diatomite material will be used in a generic sense and includes, but is not limited to, the aforementioned suitable forms of silica.

Any commercially available diatomaceous earth can be used in the invention described herein. Diatomaceous can contain impurities; and, because of the nature of diatomaceous earth, the types and amounts of impurities are highly variable and depend upon the source of the particular diatomaceous earth. Typical chemical analyses of diatomaceous earth from various sources are given in Table 1 as taken from the *Encyclopedia of Chemical Technology*, 3rd Ed., Vol. 7, pp. 606. Generally, the commercially available diatomaceous earth is a mixture of metal oxides having a silica ($SiO_2$) content of from about 87 weight percent to about 94 weight percent, an alumina ($Al_2O_3$) content of from about 2 weight percent to about 4 weight percent and numerous other trace quantities of metal oxides. As for the synthetic silicas, the purity of the silica material is much greater than that of diatomaceous earth and can approach levels greater than 99 percent silica ($SiO_2$).

TABLE 1

Typical Spectrographic Analysis of Various Diatomaceous Earths (Dry Basis)

| Constituent, % | Lompoc, Calif. | Basalt, Nev. | Sparks, Nev. |
|---|---|---|---|
| $SiO_2$ | 88.90 | 83.13 | 87.81 |
| $Al_2O_3$ | 3.00 | 4.60 | 4.51 |
| CaO | 0.53 | 2.50 | 1.15 |
| MgO | 0.56 | 0.64 | 0.17 |
| $Fe_2O_3$ | 1.69 | 2.00 | 1.49 |
| $Na_2O$ | 1.44 | 1.60 | 0.77 |
| $V_2O_5$ | 0.11 | 0.05 | 0.77 |
| $TiO_2$ | 0.14 | 0.18 | 0.77 |
| ignition loss | 3.60 | 5.30 | 4.10 |

The diatomite material will generally be present in the absorbing composition in an amount in the range of from about 10 weight percent to about 90 weight percent. Preferably, the amount of diatomite should be in the range of from 35 weight percent to 45 weight percent. As will be referred to throughout this application, the term weight percent, when used in reference to an absorption composition, means parts by weight per 100 parts by weight of the total combined weight of the components zinc oxide, diatomite and colloidal oxide of the absorption composition multiplied by the factor one hundred.

The zinc oxide used in the preparation of the absorbing composition can be either in the form of zinc oxide, or in the form of one or more zinc compounds that are convertible to zinc oxide under the conditions of preparation described herein. Examples of such zinc compounds include zinc sulfide, zinc sulfate, zinc hydroxide, zinc carbonate, zinc acetate, zinc nitrate and mixtures of any two or more thereof. Preferably, the zinc oxide is in the form of powdered zinc oxide.

The zinc oxide will generally be present in the absorbing composition in an amount in the range of from about 10 weight percent to about 90 weight percent, and will more preferably be in the range of from 45 weight percent to 90 weight percent, and will most preferably be in the range of from 45 weight percent to 70 weight percent.

As earlier mentioned, a dry diatomite material is impregnated or coated with a colloidal oxide solution prior to it being mixed with zinc oxide. The impregnation or coating of the diatomite material can be performed by any suitable method known in the art. Such suitable impregnation methods can include, but are not limited to, standard incipient wetness impregnation, which includes spraying techniques, and other techniques such as wet impregnation, spray drying, chemical vapor deposition, plasma spray deposition and the like. It is preferred, however, to use the spray impregnation technique whereby the diatomite material is contacted with a fine spray of an aqueous colloidal oxide solution wherein the solution has the desired amount of colloidal oxide material dissolved in a sufficient volume of water to fill the total pore volume of the diatomite material or, in other words, to effect an incipient wetness impregnation of the diatomite.

Any suitable metal oxide compound can be used as a part of this invention provided that they can be formed into finely divided, colloidal-size particles and uniformly dispersed in an aqueous solution or medium to form a colloidal oxide. This aqueous dispersion of the metal oxide compound can be referred to as a sol or a colloidal suspension or a colloidal oxide solution. The colloid-size particles can range in size from less than one nanometer to greater than two micrometers. Colloid-size particles can be dispersed in an aqueous system by the addition of small quantities of monovalent acids such as hydrochloric acid (HCl), nitric acid ($HNO_3$), formic acid ($H_2CO_2$), or acetic acid ($HC_2H_3O_2$). Typical solid concentrations of the dispersions can range from about 1 weight percent to about 30 weight percent solids with weight percent of solids being defined as the fraction of the weight of solids to the total weight of the colloidal oxide solution multiplied by a factor of one hundred. The solution pH can range from about 2 to about 11 depending upon the method of preparation of the aqueous dispersion or sol. It is preferred that the invention use a colloidal oxide solution comprising a metal oxide selected from the group consisting of alumina, silica, titania, zirconia, tin oxide, antimony oxide, cerium oxide, ytterium oxide, copper oxide, iron oxide, manganese oxide, molybdenum oxide, tungsten oxide, chromium oxide and mixtures of any two or more thereof. It is presently preferred that the colloidal oxide solution be one of either a colloidal alumina solution or a colloidal silica solution.

Generally, any suitable quantity of colloidal oxide solution can be used to impregnate the diatomite material. It is preferred, however, to use an amount of colloidal oxide solution that will give a metal oxide concentration in the final absorption composition in the range of from about 1 weight percent to about 15 weight percent with weight percent being based on the total weight of the final absorption composition.

Once the diatomite material is impregnated or coated, with a colloidal oxide solution, the impregnated or coated diatomite material particles are then mixed with a desired amount of dry zinc oxide powder to form an extrudable paste. The mixing of these materials can be performed by any suitable method. Suitable types of mixing devices can include, but are not limited to, tumblers, stationary shells or troughs, muller mixers, which are either batch type or continuous type, impact mixers, and the like. It is preferred to use a muller mixer in the mixing of the impregnated or coated diatomite material and the zinc oxide. It is theorized that the mixing operation disperses the colloidal oxide solution, which contains a peptizing agent, in a uniform manner and transforms the mixture into a paste like material which has rheological properties favorable for the flow of the paste through an extruder die while retaining solidity upon emerging from the extruder.

The extrudable paste is extruded by methods well known in the art. The extruded material is then dried at a temperature generally in the range of from about 75° C. to about 300° C., and more preferably in the range of from 90° C. to 250° C., for a period of time generally in the range of from about 0.5 hour to about 4 hours, and more preferably in the range of from 1 hour to 3 hours. The dried, extruded material is then calcined in the presence of oxygen at a temperature generally in the range of from about 375° C. to about 750° C., and more preferably in the range of from 500° C. to 700° C., for a period of time generally in the range of from about 0.5 hour to about 4 hours, and more preferably in the range of from 1 hour to 3 hours to produce the absorbing composition employed in the process of the present invention.

The absorbing composition employed in the process of the present invention can optionally be promoted with suitable metal oxides. Examples of suitable metal oxides include the oxides of manganese, rhenium, copper, molybdenum, tungsten, Group VIII metals, and any other metal that is known to have hydrogenation ability of the type necessary to reduce sulfur oxide species to hydrogen sulfide and mixtures of any two or more thereof. In a preferred embodiment of the present invention, the absorbing composition is promoted with nickel oxide.

The metal oxide promoter can be added to the absorbing composition in the form of the elemental metal, metal oxide, and/or metal-containing compounds that are convertible to metal oxides under the calcining conditions described herein. Some examples of such metal-containing compounds include metal acetates, metal carbonates, metal nitrates, metal sulfates, metal thiocyanates, and mixtures of any two or more thereof.

The elemental metal, metal oxide, and/or metal-containing compounds can be added to the absorbing composition by any method known in the art. One such method is the impregnation of the absorbing composition with a solution, either aqueous or organic, that contains the elemental metal, metal oxide, and/or metal-containing compounds. After the elemental metal, metal oxide, and/or metal-containing compounds have been added to the absorbing composition, the promoted composition is dried and calcined, as described hereinafter.

As previously noted herein, the elemental metal, metal oxide, and/or metal-containing compounds can be added to the absorbing composition as components of the original mixture, or they can be added after the absorbing composition has initially been dried and calcined. If the metal oxide promoter is added to the absorbing composition after it has initially been dried and calcined, then the now-promoted composition is dried and calcined a second time to form the promoted absorbing composition. The now-promoted composition is generally dried at a temperature in the range of about 75° C. to about 300° C., more preferably in the range of from 90° C. to 250° C., for a period of time generally in the range of from about 0.5 hour to about 8 hours, more preferably in the range of from 3 hours to 5 hours. The dried, promoted composition is then calcined in the presence of oxygen generally at a temperature in the range of from about 375° C. to about 750° C., and more preferably in the range of from 500° C. to 700° C., until volatile matter is removed and the elemental metal and/or the metal-containing compounds are substantially converted to metal oxides. The time required for this calcining step will generally be in the range of from about 0.5 hour to about 4 hours, and will preferably be in the range of from about 1 hour to about 3 hours.

The metal oxide promoter will generally be present in the absorbing composition in an amount in the range of from about 0.1 weight percent to about 15 weight percent, and will more preferably be in the range of from 2.0 weight percent to about 7.5 weight percent, most preferably 6.0 weight percent.

The processes of the present invention can be carried out by means of any apparatus whereby there is achieved an alternate contact of the absorbing composition with the gaseous feed stream and, thereafter, of the absorbing composition with an oxygen-containing gas which is utilized to regenerate the absorbing composition. The process is in no way limited to the use of a particular apparatus. The process of this invention can, for example, be carried out using a fixed bed of absorbing composition, a fluidized bed of absorbing composition, or a moving bed of absorbing composition. Presently preferred is a fixed bed of absorbing composition.

In order to avoid any casual mixing of the gaseous feed stream containing hydrogen sulfide with the oxygen-containing gas utilized in the regeneration step, provision is preferably made for terminating the flow of the gaseous feed stream to the reactor and subsequently injecting an inert purging fluid such as nitrogen, carbon dioxide or steam. Any suitable purge time can be utilized but the purge should be continued until all hydrocarbon and/or hydrogen sulfide are removed. Any suitable flow rate of the purge fluid may be utilized. Presently preferred is a purge fluid flow rate which will give a gaseous hourly sapce velocity (GHSV) in the range of from about 800 GHSV to about 1200 GHSV. As used herein, the term "gaseous hourly space velocity" is defined as the ratio of the reactor volume to gaseous volumetric flow rate at standard conditions of 60° F. and one atmosphere of pressure.

Any suitable temperature for the processes of the present invention can be utilized. The temperature will generally be in the range of from about 150° C. to about 600° C. and will more preferably be in the range of from 200° C. to 450° C.

Any suitable temperature can be utilized to regenerate the absorbing composition from its sulfided form back to the original absorbing composition form. The temperature will generally be in the range of from about 370° C. to about 815° C. As a result of parallel work, however, it has been discovered that the higher temperatures required to initiate the regeneration of ZnS to ZnO (i.e. about 650° C. and higher) has an adverse effect on the amount of sulfur dioxide that is produced during the subsequent absorption cycle. Due to the fact that the regeneration of NiS to NiO is an exothermic reaction, and the fact that this reaction is initiated at a lower temperature (i.e. about 425° C.), the presence of nickel oxide in the absorbing composition employed in the process of the present invention allows the regeneration to occur at a lower temperature, thereby preventing the adverse effect described above. Thus, the regeneration temperature is preferably in the range of from 425° C. to 600° C., most preferably about 425° C., to effect the regeneration within a reasonable time while not adversely affecting the production of sulfur dioxide in the treated gaseous feed stream.

Any suitable pressure can be utilized for the processes of the present invention. The pressure of the gaseous feed stream being treated is not believed to have an important effect on the absorption process of the present invention, and will generally be in the range of from about atmospheric to about 2,000 psig during the treatment.

Any suitable residence time for the gaseous feed stream in the presence of the absorbing composition of the present invention can be utilized. The residence time expressed as volumes of gas at standard temperature and pressure per volume of absorbing composition per hour will generally be in the range of from about 0.1 hours to about 0.0001 hours and will more preferably be in the range of from 0.004 hours to 0.0004 hours.

When the absorbing composition is completely sulfided it will no longer combine with the hydrogen sulfide in the manner set forth in equation (I). When this condition occurs, hydrogen sulfide will begin to appear in the effluent flowing from the reaction and this will be an indication that the absorbing composition should preferably be regenerated. The time required for the absorbing composition to become completely sulfided will generally be a function of the concentration of sulfur in the feedstock and feed rate employed.

When the absorbing composition becomes substantially completely sulfided, the absorbing composition is typically regenerated by terminating the flow of feed to the reactor and purging with an inert fluid such as nitrogen to remove any combustibles. A free oxygen-containing gas is then introduced to the reactor for the purpose of oxidizing the zinc sulfide in accordance with equation (II).

The amount of oxygen supplied to the reactor during the regeneration step will generally be sufficient to at least substantially remove sulfur from the absorbing composition. The regeneration step is generally conducted at about atmospheric pressure. The temperature for the regeneration step is generally maintained in the range of about 370° C. to about 815° C., and is more preferably maintained at about 425° C. in order to oxidize the zinc sulfide within a reasonable time.

The following examples are presented in further illustration of the invention.

EXAMPLE I

Diatomite material in the form of dry celite powder was impregnated in a mixing bowl to incipient wetness using Nyacol AL-20 colloidal alumina solution in an amount sufficient so that the final absorption formulations contained 1 to 15 percent by weight alumina. As shown in Table 2, absorption composition B contained 10 weight percent alumina and absorption composition C contained 5 weight percent alumina. Other absorption compositions D and E were similarly prepared using Nyacol 2040 HH4 colloidal silica and Nyacol 2034 DI colloidal silica, respectively, to give a composition having 10 weight percent silica. The colloidal alumina solution and colloidal silica solution are commercially produced products of Nyacol Products Inc. and are referred to above by their trade designations. It was found that the commercially available colloidal oxide solution can be used as is without the further addition of an acid.

The coated celite particles were then mixed with calculated amounts of dry ZnO powder to yield about 50 percent by weight of ZnO in the product. The final formulations of the absorption compositions are also shown in Table 2. An extrudable paste was formed from the mixing of the coated celite particles and dry ZnO powder followed by extrusion through a 1" laboratory Bonnot single screw extruder. In order to determine whether the coating was effective in reducing equipment wear, equal quantities, each being 1500 grams, of materials were extruded through copper (Cu) dies containing four ⅛" diameter holes in 1" laboratory Bonnot extruders. After extrusion, the die weight loss was measured for each extrusion and compared with the weight loss observed during the extrusion of a comparative absorption composition comprising zinc oxide, uncoated celite and alumina at identical conditions; this would be indicative of the wear in a commercial equipment. The weight loss observed in the extrusion dies using the different preparations are included in Table 2. It is evident that colloidal alumina coated celite preparations resulted in substantial reductions in the die weight loss which ranged from 0.01 to 0.03 grams as compared with 0.28 grams for the control absorption composition.

TABLE 2

Die Plate Wear During Extrusion

| Colloidal Oxide (%) | Absorbent | Final Formulation* ZnO/Celite/ Al$_2$O$_3$/Silica | Weight Loss From Die, grams |
|---|---|---|---|
| None (Control) | A | 50/40/10/0 | 0.28 |
| Al-20 10% | B | 50/40/10/0 | 0.01, 0.02 |
| 5% | C | 50/45/5/0 | 0.03 |
| Si-2040HN4 10% | D | 50/40/0/10 | 0.03 |
| Si-2034DI 10% | E | 50/40/0/10 | 0.03 |

*weight percent of total composition

The wet extrudates were dried at 275° F. for 3 hours and then calcined at 1175° F. for two hours. The dried and calcined extrudates were impregnated using the incipient wetness method with sufficient amount of Ni(NO3)2.6H20 dissolved in water to yield 7.5 weight percent nickel oxide promoter in the extrudates. The weight percent of nickel oxide promoter present in the absorption composition is based upon the total weight of the unpromoted absorption composition. This was followed by another drying and calcination step as described above. The physical characteristics of the material before and after nickel impregnation are shown in Table 3. From this data it is evident that no loss in the physical integrity (crushing strength) or pore volume was noted by the inclusion of colloidal alumina oxide coated celite particles at equal alumina level to the standard composition. However, it was surprisingly found that an acceptable crush strength and pore volume can be achieved at much lower colloidal alumina levels than was previously thought or achieved. For example, at only 5 percent colloidal alumina in the formulation, the pore volume remains unchanged and the crush strength, after promoter incorporation (final absorbent form), had only a minor reduction as compared to the control formulation.

TABLE 3

Physical Properties of New H$_2$S Absorbents

| Colloidal Oxide (%) | Absorbent | Before Ni Impreg. | | | Final Composition Cr. Str. lb/p |
|---|---|---|---|---|---|
| | | Cr. Str. lb/p | Bulk D. g/cc | Water PV cc/g | |
| None (Control) | A | 3 | 0.78 | 0.40 | 8 |
| Al-20 10% | B | 5 | 0.79 | 0.38 | 10 |
| 5% | C | 2 | 0.75 | 0.40 | 7 |
| Si-2040NH4 10% | D | 3 | 0.94 | 0.30 | 16 |
| Si-2034DI 10% | E | 2.8 | 0.92 | 0.32 | 14 |

EXAMPLE II

In order to test the efficacy of the new formulations, the compositions were subjected to a standard absorption test in which the absorbents were alternately contacted with gaseous streams containing either hydrogen sulfide (H$_2$S) mixed with inert gases such as a mixture of carbon dioxide (CO$_2$) and nitrogen (N$_2$) in the absorption step to load sulfur in the absorbent (ZnS form), or air to regenerate the sulfur-loaded absorbent to its original ZnO form (regeneration step). The reactor temperature for the two steps were 800° F. and 1100° F. respectively. The sulfur loading on the absorbent was determined to be complete when hydrogen sulfide was detected in the effluent stream, at that point the sulfided material was regenerated in air. The sulfur dioxide (SO$_2$) concentration was measured at a point in time 10 minutes after the start of absorption step and at breakthrough (BT). The test data is included in Table 4. It is clear from this data that the absorbents of this invention are highly effective in sulfur removal; being at least equivalent or superior to the standard absorbent in performance. Thus, a new formulation for hydrogen sulfide absorbent is described in this invention which is highly effective in sulfur removal, uses much lower proportion of a binder than previously determined possible, and eliminates the highly troublesome and costly equipment wear caused by extruding the abrasive silica in the formulation.

TABLE 4

Hydrogen Sulfide Absorption Test Results

| Absorbent | Composition* ZnO/Celite/ Al$_2$O$_3$/NiO | Cycle # | SO$_2$, ppm | | Sulfur Loading Wt % |
|---|---|---|---|---|---|
| | | | 10 min | BT | |
| A (Control) | 50/40/10/7.5 | 1 | 180 | 60 | 10.6 |
| | | 14 | | | 13.2 |
| | | 20 | 950 | 630 | 13.1 |
| B (Inven.) | 50/40/10/7.5 | 4 | 700 | 600 | 14.2 |
| | | 17 | 1000 | 520 | 13.0 |
| | | 22 | 750 | 500 | 13.2 |
| | | 25 | 740 | 420 | 12.7 |
| C (Inven.) | 40/45/5/7.5 | 1 | 80 | 50 | 10.7 |
| | | 8 | 1350 | 950 | 14.0 |
| | | 27 | 980 | 580 | 13.5 |
| | | 34 | 832 | 530 | 13.8 |

BT = Breakthrough
Cycle # = Absorption cycle in which data was collected. One cycle comprises an absorption step and a regeneration step.
*Weight percent of the composition is based on one hundred percent representing the total weight of the non-promoted composition.

The invention described herein is a novel composition comprising zinc oxide and a diatomite material coated with a colloidal oxide that is manufactured by a novel method comprising the steps of coating a diatomite material with a colloidal oxide solution followed by mixing the coated diatomite material with zinc oxide to form an entrudable paste. The novel composition can be utilized in a novel absorption process by contacting it with a fluid stream containing hydrogen sulfide under suitable absorption conditions. As shown in Example I above, the use of coated diatomite material in the process for manufacturing an absorbent composition significantly reduces the amount of die weight loss observed during manufacturing thereby improving the economic efficiency of producing the composition. This reduction in die wear reduces the amount of production downtime and the quantity of extruder dies required to produce a given quality of absorbent material resulting in a lower cost of production. It has been demonstrated that the use of a coated diatomite material to produce an absorbent composition does not have a negative impact upon the absorption characteristics of the final absorbent properties. By lowering the absorbent material production costs, the cost of removing sulfur compounds from fluid streams contaminated with such is lowered thereby improving economic efficiency of the sulfur removal process.

Reasonable variations and modifications are possible within the scope of this disclosure without departing from the scope and spirit thereof.

That which is claimed is:

1. A method comprising the steps of:
    (a) coating a diatomite material with a colloidal oxide solution;
    (b) mixing the thus coated diatomite material with zinc oxide to form an extrudable paste; and
    (c) extruding said extrudable paste to form an extrudate.

2. A method as recited in claim 1 wherein the composition of said extrudable paste comprises zinc oxide present in the range of from about 10 weight percent to about 90 weight percent, diatomite material present in the range of from about 10 weight percent to about 90 weight percent, and colloidal oxide present in the range upwardly to about 15 weight percent.

3. A method as recited in claim 1 wherein the composition of said extrudable paste comprises zinc oxide present in the range of from 45 weight percent to 70 weight percent, diatomite material present in the range of from 35 weight percent to 45 weight percent, and colloidal oxide present in the range of from about 1 to 15 weight percent.

4. A method as recited in claim 2 wherein:
    said colloidal oxide is selected from the group consisting of colloidal alumina, colloidal silica, colloidal titania, colloidal zirconia, colloidal tin oxide, colloidal antimony oxide, colloidal cerium oxide, colloidal yttrium oxide, colloidal copper oxide, colloidal iron oxide, colloidal manganese oxide, colloidal molybdenum oxide, colloidal tungsten oxide, colloidal chromium oxide and mixtures of any two or more thereof.

* * * * *